July 21, 1953 F. H. McINTOSH 2,646,467

WIDE BAND AMPLIFIER

Filed July 13, 1949 2 Sheets-Sheet 1

INVENTOR
FRANK H. MCINTOSH

BY Hyman Hurvitz

ATTORNEY

July 21, 1953 F. H. McINTOSH 2,646,467

WIDE BAND AMPLIFIER

Filed July 13, 1949 2 Sheets-Sheet 2

INVENTOR
FRANK H. MCINTOSH

BY [signature]
ATTORNEY

Patented July 21, 1953 2,646,467

UNITED STATES PATENT OFFICE 2,646,467

WIDE BAND AMPLIFIER

Frank H. McIntosh, Chevy Chase, Md.

Application July 13, 1949, Serial No. 104,450

17 Claims. (Cl. 179—171)

The present invention relates generally to improved wide band amplifiers, particularly for use in the audio and video frequency bands, and more particularly to improved audio and video electronic amplifiers which introduce extremely slight distortion over a wide band of frequencies, by utilizing unity coupled output devices, connected in novel relation to the electronic tubes of the amplifier.

The amplifier of the present invention will probably find maximum application in class B operation, that is, the operation in which the tubes of the amplifier are operated push-pull and biased approximately to cut-off. It is to be understood, however, that the invention is not limited to class B operation of push-pull amplifiers, but may apply equally to class A or class AB operation, or, in fact, to any mode of operation wherein plate current flows, in at least one of two push-pull tubes, at all times in response to input signal.

The frequency limits of the conventional audio or video frequency amplifier, or other wide band amplifier, depend largely upon the design of the output transformer, loss in amplification at low frequencies resulting from the low incremental inductance of the transformer primary, and falling off of response at high frequencies resulting from leakage inductance and the various distributed capacities of the transformer.

In order to obtain a good low frequency response the incremental primary inductance of the transformer must be high relative to the plate resistance of the tubes used. The primary winding of the transformer, then, should have a large number of turns. At the same time the resonant frequency of the leakage inductance and secondary capacitance must be beyond the highest frequency desired to be amplified, so that low leakage inductance and shunt capacity is essential, if the frequency response of the transformer is to be extended.

The above requirements are mutually conflicting, in various respects. The size of the core of the transformer, i. e., the total iron utilized, is limited by consideration of cost, space and weight requirements. This in turn fixes the total number of turns allotted to the primary and secondary windings. Decreasing core size and increasing total turns on the primary winding to retain high primary incremental inductance increases leakage inductance and shunt capacity, which in turn, reduces resonant frequency, and hence the high frequency response of the transformer. In practice leakage inductance is decreased by interleaving primary and secondary windings, but this increases distributed capacity and so tends to neutralize the benefits obtained.

As a further consideration, high permeability cores must be used, to increase primary winding inductance. Such cores are adversely affected, in respect to the incremental inductance, by D.-C. magnetization. Hence, the latter must be avoided.

The effect of leakage inductance on class B push-pull amplifiers, has been considered in the literature, and attention is directed particularly to an article by Sah in Proceedings in the Institute of Radio Engineers for November 1936. Sah points out particularly the deleterious effects of leakage inductance between primary windings of the output transformer of such an amplifier, first, in causing a decreased output, as frequency increases, and second, in introducing time constants into the circuit, thus causing transients which distort the output wave as one of the tubes changes from a conducting condition to a blocking condition, and vice-versa. The latter effect is the basis of greatest distortion at the higher audio frequencies, and the distortion which it is the primary object of the present invention to avoid.

It is a primary object of the present invention to provide improved push-pull amplifiers having negligible leakage reactance in their output transformers, and hence, negligible transient effects during change over of each tube of the amplifier from conducting to non-conducting condition.

It is another object of the invention to provide novel push-pull audio, video, or other wide band amplifiers, capable of employing transformers having bi-filarly wound primary windings.

It is another object of the present invention to provide a push-pull amplifier utilizing an output transformer having tri-filarly wound primary windings, or unity coupled primary windings, the amplifier employing pentode, tetrode, or beam power electronic tubes, wherein is provided means for maintaining the screen grid of each of the tubes at a fixed but adjustable potential with respect to the associated cathode during operation of the tubes in the amplifier.

It is still another object of the invention to provide a push-pull amplifier arrangement capable of effectively utilizing a transformer having substantially zero leakage inductance between its primary windings, and which requires but a single anode voltage source for all the tubes of the amplifier, and wherein the screen grids of the amplifier tubes may be maintained at a fixed potential with respect to the associated cathode during operation of the tubes in the amplifier, this fixed potential being different from the anode potential.

It is a further object of the invention to provide a novel push-pull amplifier arrangement wherein the anode of each of the tubes is coupled respectively to the cathode of the other of the tubes, in unity coupled relation.

It is still another object of the invention to provide a novel push-pull amplifier for wide band distortionless operation, which utilizes cathode coupled and anode coupled resistances simultaneously associated with each of the push-pull connected tubes, and wherein the cathode of one of the tubes is unity coupled to the anode of the other of the tubes, and the anode of the other of the tubes unity coupled to the cathode of the first mentioned tube.

It is still another object of the present invention to provide a novel push-pull wide band distortionless amplifier, utilizing cathode loaded and anode loaded tubes, the loading being accomplished by means of impedances of similar character and similar value, and wherein the anode of each of the tubes is unity coupled to the cathode of the other of the tubes.

Briefly described, the various embodiments of the present invention hereinafter described in detail, and illustrated in the accompanying drawings, attain the objects of the invention by employing unity coupled impedances in push-pull amplifiers, which reduces to a negligible value the leakage impedance between the coupling impedances. The effect of substantially eliminating these leakage impedances is radically to reduce transients during current cross-over from one to another of the tubes of the push-pull amplifier, these transients being particularly severe in class B operation. In accordance with one embodiment of the present invention, a center tapped choke coil is connected with its center tap to the negative terminal of the anode voltage supply source and with its remaining terminals to the cathodes of a pair of push-pull driven amplifier tubes. Similarly, a center tapped choke is connected with its center tap to the positive terminal of the source of anode supply voltage and with its remaining terminals to the anodes of the tubes. The anode of the first of the tubes is then coupled via a low impedance or by-pass condenser to the cathode of the second of the tubes and the anode of the second of the tubes is connected via a similar condenser to the cathode of the first of the tubes. The circuit described is accordingly, similar to that employed in my prior application, Serial No. 66,741, for Amplifiers, filed December 22, 1948, now Patent No. 2,477,074 issued July 26, 1949, except in that, in certain embodiments of the present invention bifilar windings are not employed, nor are inherently unity coupled windings employed, but on the contrary separate inductances are employed, which are effectively unity coupled by means of condensers. The present invention accordingly involves a modification of the system described in my prior application identified supra, which leads to certain economies of construction, by virtue of the fact that special transformers are not employed.

As a further feature of the embodiment of my invention described immediately above, a further center tapped choke is provided which has its center tap connected to the positive terminal of a source of screen grid voltage, the remaining terminal of the source of screen grid voltage being connected to the negative terminal of the source of anode voltage. The remaining terminals of the choke coil are then connected to the screen grids of the tubes of the amplifier, and coupled by means of low impedance condensers to the cathodes of the same amplifier tubes. Thereby, the screen grid voltage of each of the tubes may be maintained at a constant difference of potential from the cathode of the tube while the tube is being driven, and this voltage need not be the same voltage as is applied to the anodes of the tubes. Maintenance of the described voltage relations results in greatly increased efficiency of operation of the tubes, and the connections described, which enable any suitable voltage to be applied and maintained at the screen grids, enables the optimum voltage to be so applied. This is in distinction to the structure employed in my prior application identified supra, wherein the screen grids were necessarily maintained at the same voltage as the anodes of the tubes, a condition which, in general, is not optimum.

A modification of the embodiment of my invention above described may be resorted to, wherein, instead of employing center tapped chokes, separate chokes may be connected in the cathode and anode circuit and in the screen grid circuit of each of the triodes, the inter-connection of the chokes being otherwise identical, and the operation of the two embodiments being substantially indistinguishable.

As a further modification of the present invention, I may substitute, for the chokes utilized in the second described embodiment, resistances to provide the necessary coupling impedance. While the use of resistances results in a considerable drop in output power available from the amplifier, in response to the same signals and applied voltages, and further in a drop in efficiency, the use of resistances enables construction of a particularly economical and cheap amplifier, which on a price basis, is capable of competing with any amplifiers presently on the market, while retaining that low or negligible distortion over a wide band of frequencies, which is characteristic of amplifiers connected in accordance with the inventions herein described and the inventions described in my prior application, Serial No. 66,741.

In accordance with still another embodiment of the invention, I employ tri-filarly wound transformers in a manner precisely similar to that disclosed in connection with the embodiment illustrated in Figure 3 of my application, Serial No. 66,741, with the exception that in this embodiment of my invention, I employ a tri-filarly wound transformer having three separate windings, each of which is center tapped. The additional winding, not provided in Figure 3 of my application, Serial No. 66,741, is employed in conjunction with a source of screen grid voltage which can be separate from the source of anode voltage employed for establishing the value of screen grid voltage with respect to the cathode in each of the tubes, and enables utilization of optimum screen grid voltages which are not limited to a value equal to the anode voltage, while maintaining all the other advantages of the system described in my prior application, and illustrated in Figure 3 thereof.

Reference is now made to the accompanying drawings, which illustrate five embodiments of my invention which are described in detail hereinafter, and wherein.

Figure 1:
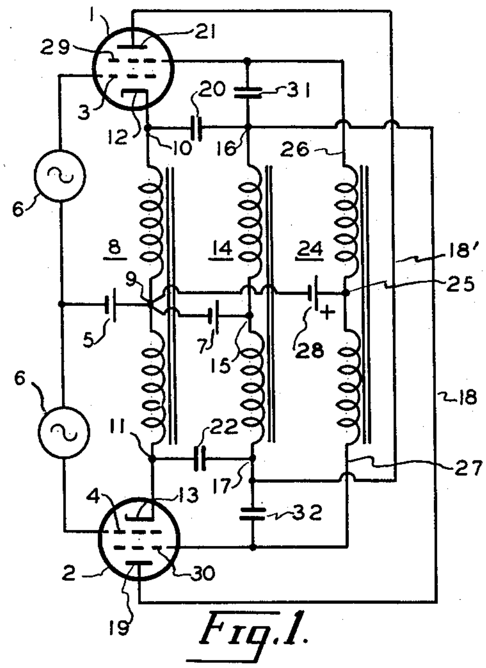
Figure 1 is a schematic circuit diagram of a first embodiment of my invention employing three center tapped chokes.

The amplifier of Figure 1 is illustrated as employing a pair of tetrodes 1, 2, as amplifying electronic devices, it being understood, however, that the invention as disclosed in Figure 1 may be applied to pentodes, or beam power tubes, and by suitable modification, to triodes, the modification involved being the omission of the circuits and voltage supplies necessary for supplying screen grid voltages and couplings. The control electrodes 3 and 4 of the tetrodes 1 and 2 are biased by means of a bias source conventionally illustrated as a battery 5, and driven in push-pull relation by a source of wide band voltage illustrated as 6. The bias source 5 may have a magnitude such as to cause operation of the tetrodes 1 and 2, class B, class A, class AB, or in any intermediate mode, so long as the operation is such that at least one of the tetrodes 1, 2 supplies anode current in response to any applied signal. The significance of the classification of the modes of operation of the amplifiers are well understood in the art, and are defined by the Institute of Radio Engineers in its official definitions.

While the circuits and structures of the present application have wide utility in amplifiers operating in accordance with any one of the above-mentioned classifications, or in the general mode above described, the invention has primary application to class B amplifiers and will be described accordingly as utilized in amplifiers of this class, without intending thereby to limit the scope of the invention.

A source of anode voltage 7 is provided, conventionally illustrated as a battery to simplify the drawings. A center tapped inductance 8 having a center tap 9 and terminals 10 and 11 is connected with its center tap 9 to the negative terminal of the anode voltage source 7, with its terminal 10 to the cathode 12 of the tetrode 1 and with its terminal 11 to the cathode 13 of the tetrode 2. The tetrodes 1 and 2, accordingly, will be seen to be cathode loaded by the center tapped inductance 8. A further center tapped inductance 14 is provided having a center tap 15 and terminals 16 and 17. The center tap 15 is connected to the positive terminal of the anode voltage supply 7, the terminal 16 is connected directly by means of a lead 18 to the anode 19 of the tetrode 2, and the terminal 17 is connected directly by means of a lead 18′ to the anode 21 of the tetrode 1.

In accordance with the present invention, the anode 19, or the terminal 16, which is at the same potential, is connected via a low impedance condenser 20 to the cathode 12, and the anode 21, which is always at the same potential at the terminal 17, is coupled via a low impedance condenser 22 to the cathode 13. Otherwise stated, the terminals 10 and 16 are connected via the condenser 20 and the terminals 11 and 17 via the capacitance 22.

By virtue of the couplings established by the condensers 20 and 22 the anode 19 is maintained at all times at the same A.-C. potential as the cathode 12 and the anode 21 is maintained at all times at the same A.-C. potential as the cathode 13. There is then substantially no leakage impedance as between the windings 8 and 14, and the conditions for distortionless operation of the amplifier system are thereby established, distortion being especially eliminated during the cross-over of operation from one of the tetrodes to the other.

The system as so far described is suitable for operation with triodes. Nevertheless, in conventional amplifier practice, it is usual to utilize tetrodes or pentodes for highest efficiency. In operating the system either with tetrode or pentode tubes, if the voltage of the screen grid of any one of the tubes is not maintained at a constant value with respect to the cathode of that tube, a considerable loss of efficiency occurs, as well as distortion of the output signal. In my application Serial No. 66,741, filed December 22, 1948, and entitled "Amplifiers," maintenance of the necessary voltage relationship between screen grids and cathodes was accomplished and maintained by tying the screen grid of each of the tubes to the anode of the other of the tubes. Thereby, however, the screen grids were maintained at the D.-C. potential of the anodes. This value of screen grid potential may not be an optimum value, and in general, is not an optimum value with some commercial tubes. In accordance with the present invention the necessary D.-C. and A.-C. voltages are applied to the screen grids of the tetrodes 1 and 2 by means of a further center tapped inductance 24 having a center tap 25 and terminals 26 and 27. The center tap 25 may be connected to the positive terminal of a source of screen grid voltage 28, the negative terminal of which is connected to the terminal 9. The terminal 26 may then be connected to the screen grid electrode 29 of the tetrode 1 and the terminal 27 directly to the screen grid electrode 30 of the tetrode 2. The D.-C. value of the screen grid voltages is then established by the voltage of the source 28. In order to maintain constant A.-C. potential between the screen grid 29 and the cathode 12 of the tetrode 1, the terminal 26 is connected via a low impedance capacitance 31 to the terminal 16, or in the alternative directly to the cathode 12. Similarly the terminal 27 may be coupled to the cathode 13 via a condenser 32 having low impedance, one terminal of which may be connected to the terminal 27 and the other terminal of which may be connected either to the terminal 17 or directly to the cathode 13. There will, accordingly, be developed across the inductance 24 A.-C. voltages corresponding precisely with those developed across the inductance 8, which will be superimposed on the D.-C. voltage supplied by the source 28, maintaining the necessary voltage relations.

Figure 2:
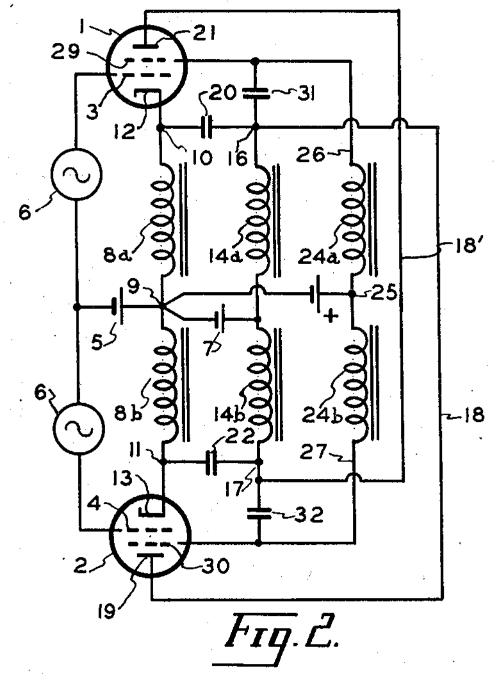
Figure 2 is a modification of the system of Figure 1 wherein six separate chokes are employed.

In the embodiment of my invention illustrated in Figure 2 almost precisely the same circuit as that illustrated in Figure 1 is utilized with the one exception that the inductance 8 of Figure 1 is constructed as two separate inductances 8a and 8b, in that the inductance 14 of Figure 1 is constructed as two separate inductances 14a and 14b, and in that the single inductance 24 of Figure 1 of the drawings is constructed as two separate inductances 24a and 24b. The mode of operation, the results obtainable, and the general theory of operation, remain the same in the cases of Figures 1 and 2. Accordingly, no further explanation or description of the system of Figure 2 appears to be required.

Figure 3:
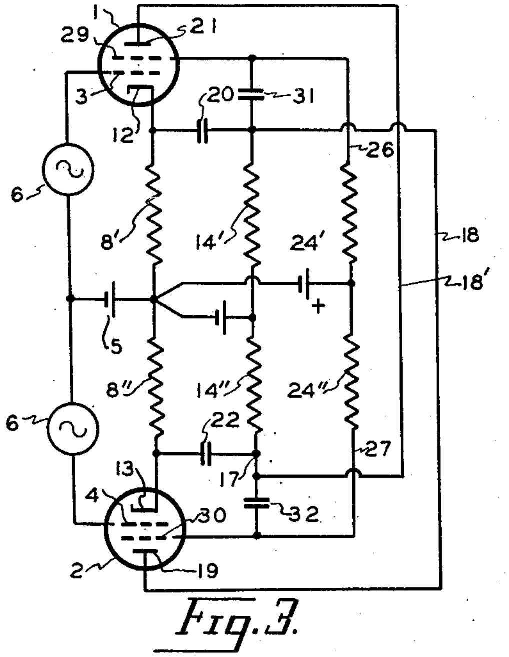
Figure 3 is a circuit diagram of a modification of my invention which parallels that illustrated in Figure 2 except that resistances are substituted for the chokes employed in the system of Figure 2.

Reference is now made particularly to Figure 3 of the drawings wherein is illustrated a system paralleling that illustrated in Figure 2 with the exception that resistances are substituted for inductances. Specifically, for the inductance 8a, is substituted a resistance 8', and for the inductance 8b a resistance 8'', for the inductance 14a a resistance 14', for the inductance 14b a resistance 14'', for the inductance 24a, a resistance 24' and for the inductance 24b a resistance 24''. It will be realized that the system of Figure 3 operates precisely as does the system of Figures 1 and 2 except in those respects which are occasioned by the substitution of resistances for inductances. As is well known, the use of resistances causes D.-C. voltage drops, which are minimized in amplifier circuits utilizing inductances as load circuits for the tubes of the amplifier. There is a consequent drop in available output A.-C. voltage, and further a drop in efficiency due to losses occurring in the coupling or output resistances. At the same time, where expense is a primary consideration, the use of resistance coupled amplifiers may be resorted to, because resistances cost very much less than do chokes or inductances of the same impedance, and for some purposes economy is a primary consideration and total available output or efficiency of operation, a secondary consideration.

Figure 4:
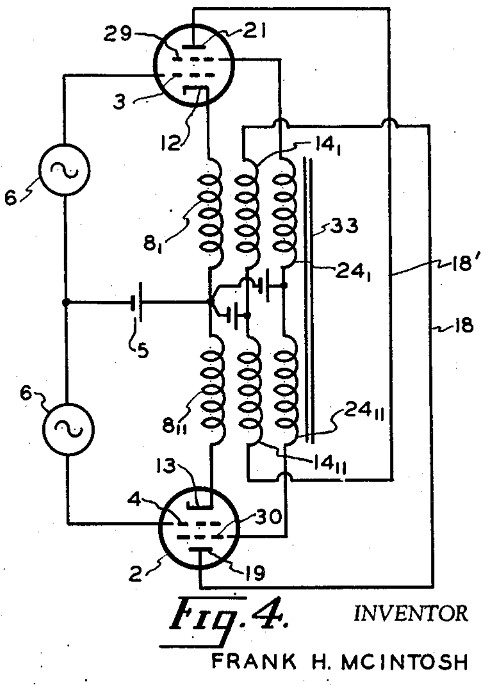
Figure 4 is still another embodiment of my invention wherein unity coupled windings are employed having three bi-filar windings, and wherein the screen grid voltages of the amplifier tubes may be maintained at any desired voltage, independently of the anode voltage applied to the tubes.

Reference is now made to Figure 4 of the accompanying drawings, which provides an improvement on the system illustrated in Figure 3 of my application, Serial No. 66,741, filed December 22, 1948. In that application, and particularly in Figure 3 of the drawings, thereof, use is made of bi-filarly wound primary windings in output transformers for the amplifier comprising the invention. The circuit of Figure 3 employs pentode tubes for purposes of amplification of applied signals, and the screen grids of these pentode tubes are connected to appropriate anodes of the tubes in order to maintain constant the voltage between the screen grid and the cathode of each of the tubes, which in turn is required in order to maintain high conversion efficiency in the tubes. Nevertheless, the system disclosed requires that the D.-C. voltages be equal to the anode D.-C. voltages in each of the tubes. This choice of voltage, being imposed upon the circuit, may, nevertheless, not prove to be an optimum value of screen grid voltage.

Figure 5:
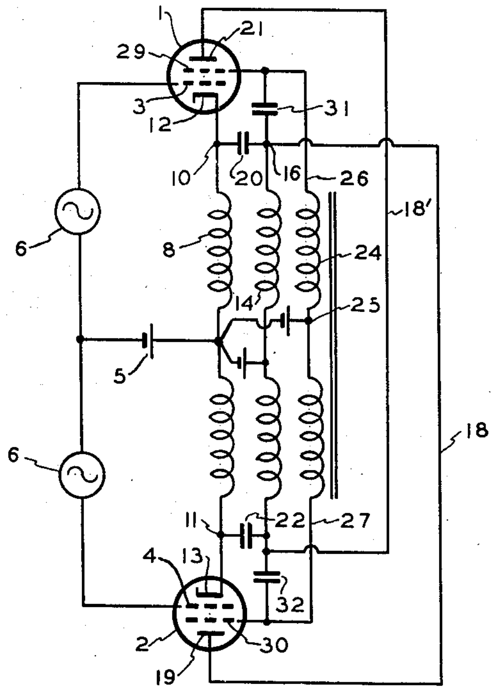
Figure 5 is a modification of the system of Figure 1 which employs a single core.

Accordingly, I have devised a system which is illustrated in schematic diagram in Figure 4 of the accompanying drawings, wherein tri-filar windings are provided, which are combined with a separate source of screen grid voltage, which is independent of anode voltage in the system, and which may, accordingly, be selected to provide optimum operating conditions for the amplifier. The system is, accordingly, similar to that disclosed in Figures 1 and 2 of the accompanying drawings, with the exception that unity coupling is accomplished by tri-filarly winding the inductances involved, rather than by coupling these inductances by means of low impedance coupling condensers. A full explanation of the operation and mode of connection of the system of Figure 4 appears, accordingly, to be unnecessary to a full understanding of the invention, it being understood that in place of the windings 8a, 8b, 14a, 14b, 24a, 24b of Figure 2 of the drawings, the terminals of which are suitably inter-coupled by means of low impedance coupling condensers, I provide in the modification of my invention illustrated in Figure 4 of the drawings windings $8_{I}$, $8_{II}$, $14_{I}$, $14_{II}$, $24_{I}$, $24_{II}$, all of which are tri-filarly wound with respect to one another on the same core 33. Except in respects specified, the operation and mode of connection of the circuit illustrated in Figure 4 parallels closely that of the circuits illustrated in Figures 1, 2 and 3, and, accordingly, further description of the inter-connection of the elements and mode of operation of the system of Figure 4 is deemed unnecessary and redundant, and accordingly, is dispensed with. It should be realized, moreover, that other types of unity coupled transformers are disclosed in my prior application, supra, and may be substituted for the tri-filarly wound transformer of Figure 4 of the accompanying drawings. It will further be clear that the windings of Figure 1 may be wound on a single core, instead of on separate cores, if desired, as illustrated in Figure 5 of the accompanying drawings.

It should further be clear that windings $14_{I}$, $14_{II}$, may be provided with a greater number of turns than windings $8_{I}$, $8_{II}$, respectively, if desired.

It will further be clear that in each embodiment of the invention illustrated the arrangement and connections of the coupling condensers may be varied without departing from the essential concept of the invention, i. e., that of capacitively coupling over a path of low impedance, certain elements of the tubes utilized in the system.

While I have described and illustrated various specific embodiments of my invention, it will be realized that variations and modifications of the specific circuits illustrated and described may be resorted to without departing from the true spirit and scope of my invention.

What I claim and desire to secure by Letters Patent of the United States is:

1. A push-pull wide band amplifier, comprising, a first electronic amplifier tube having a first anode, cathode and control electrode, a second electronic amplifier tube having a second anode, cathode and control electrode, a negative voltage terminal, a positive anode voltage terminal, a first impedance directly connected between said negative terminal and said first cathode, a second impedance directly connected between said negative voltage terminal and said second cathode, said first and second impedances being the sole elements between said negative voltage terminal and said cathodes, a third impedance directly connected between said positive anode terminal and said second anode, a fourth impedance directly connected between said positive anode terminal and said first anode, a condenser of substantially zero impedance at the lowest frequency for which said amplifier is designed directly coupling said first cathode to said second anode, and a condenser of substantially zero impedance at the lowest frequency for which said amplifier is designed directly coupling said first anode to said second cathode, means for applying input signals in push-pull relation to said control electrodes, and means for biasing said control electrodes to provide anode current flow in at least one of said tubes in response to any finite signal, said first, second, third and fourth impedances being equal to each other for all frequencies of said wide band.

2. The combination in accordance with claim 1 wherein said impedances are inductances.

3. The combination in accordance with claim 1 wherein said impedances are resistances.

4. The combination in accordance with claim 1 wherein said first and second impedances are inductances wound on a common core, and wherein said third and fourth impedances are inductances wound on a common core.

5. A push-pull wide band amplifier, comprising, a first electronic amplifier tube having a first anode, cathode, control electrode and screen electrode, a second electronic amplifier tube having a second anode, cathode, control electrode and screen electrode, a negative terminal, separate positive anode and screen grid terminals, a first impedance connected between said negative terminal and said first cathode, a second impedance connected between said negative terminal and said second cathode, a third impedance connected between said positive anode terminal and said second anode, a fourth impedance connected between said positive anode terminal and said first anode, a fifth impedance connected between said positive screen grid terminal and said first screen grid, a sixth impedance connected between said positive screen grid terminal and said second screen grid, capacitive means for coupling said first anode and said second cathode, capacitive means for coupling said second anode and said first cathode, capacitive means for coupling said first screen grid and said first cathode, capacitive means for coupling said second screen grid and said second cathode, means for applying input signals in push-pull relation to said control electrodes, and means for biasing said control electrodes to provide anode current flow in at least one of said tubes in response to any finite signal.

6. The combination in accordance with claim 1 wherein said impedances are inductances.

7. The combination in accordance with claim 6 wherein said impedances are resistances.

8. The combination in accordance with claim 5 wherein said 1st and 2nd impedances are inductances wound on a common core, wherein said 3rd and 4th impedances are inductances wound on a common core, wherein said 5th and 6th impedances are inductances wound on a common core.

9. In combination, a push-pull wide band amplifier, comprising, a first electronic amplifier tube having a first anode, cathode, control electrode and screen electrode, a second electronic amplifier tube having a first anode, cathode, control electrode and screen electrode, a negative terminal, separate positive anode and screen grid terminals, push-pull input terminals for applying input signal to said control electrodes, a first impedance connected between said negative terminal and said first cathode, a second impedance connected between said negative terminal and said second cathode, a third impedance connected between said positive anode terminal and said second anode, a fourth impedance connected between said positive anode terminal and said first anode, a fifth impedance connected between said positive screen terminal and said first screen electrode, a sixth impedance connected between said positive screen terminal and said second screen electrode, means for maintaining substantially identical voltage excursions at said first cathode, second anode and first screen electrode and means for maintaining substantially identical voltage excursions at said second cathode, first anode, and second screen electrode, in response to said input signal.

10. The combination in accordance with claim 9 wherein said first, second and third impedances are unity coupled and wherein said fourth, fifth and sixth impedances are unity coupled.

11. The combination in accordance with claim 9 wherein said first, second and third impedances are tri-filarly related and wherein said fourth, fifth and sixth impedances are tri-filarly related inductances.

12. The combination in accordance with claim 9 wherein said impedances are resistances.

13. The combination in accordance with claim 9 wherein said impedances are inductances.

14. The combination in accordance with claim 9 wherein said means for maintaining substantially identical voltage excursions consist of capacitive couplings among said first cathode, said second anode and said first screen electrode, and further capacitive couplings among said second cathode, first anode and second screen electrode.

15. The combination in accordance with claim 5 wherein all said impedances are inductances, and wherein all said inductances are wound on a common core.

16. The combination in accordance with claim 9 wherein said impedances are inductances and wherein said inductances are all wound on a common core.

17. The combination in accordance with claim 9 wherein said impedances are inductances and wherein said inductances are all wound on a common core, and wherein said means for maintaining substantially identical voltage excursions are coupling condensers.

FRANK H. McINTOSH.

References Cited in the file of this patent

UNITED STATES PATENTS

| Number | Name | Date |
|---|---|---|
| 2,202,506 | Robin | May 28, 1940 |
| 2,292,136 | Lindsay et al. | Aug. 4, 1942 |
| 2,411,517 | Busignies | Nov. 26, 1946 |
| 2,429,124 | Cunningham | Oct. 14, 1947 |
| 2,477,074 | McIntosh | July 16, 1949 |

FOREIGN PATENTS

| Number | Country | Date |
|---|---|---|
| 892,851 | France | May 23, 1944 |